US008273697B2

(12) United States Patent
Seita et al.

(10) Patent No.: US 8,273,697 B2
(45) Date of Patent: Sep. 25, 2012

(54) PIPE UNBLOCKER WITH VISUAL TEMPERATURE AND RINSING INDICATOR

(76) Inventors: Victor Seita, Dammartin sur Tigeaux (FR); Roger Sicot, Paris (FR); Vincent Delaire, La Ferte-Sous-Jouarre (FR); Yann Denolle, Neuilly sur Seine (FR)

( * ) Notice: Subject to any disclaimer, the term of this patent is extended or adjusted under 35 U.S.C. 154(b) by 0 days.

(21) Appl. No.: 12/476,388

(22) Filed: Jun. 2, 2009

(65) Prior Publication Data

US 2009/0298734 A1 Dec. 3, 2009

(30) Foreign Application Priority Data

Jun. 2, 2008 (FR) ...................................... 08 53605

(51) Int. Cl.

| | |
|---|---|
| ***C11D 3/20*** | (2006.01) |
| ***C11D 3/395*** | (2006.01) |
| ***B08B 9/00*** | (2006.01) |
| ***C08B 7/00*** | (2006.01) |
| ***C09K 13/04*** | (2006.01) |

(52) U.S. Cl. ......... 510/238; 510/195; 134/22.1; 134/40; 252/79.2

(58) Field of Classification Search .................. 510/238, 510/195; 134/22.1, 40; 252/79.2
See application file for complete search history.

(56) References Cited

U.S. PATENT DOCUMENTS

| | | | | |
|---|---|---|---|---|
| 3,001,947 | A * | 9/1961 | Stahler et al. | 510/105 |
| 3,936,385 | A * | 2/1976 | Cheng | 510/100 |
| 4,016,089 | A | 4/1977 | Regan et al. | |
| 4,353,866 | A * | 10/1982 | Wong | 422/37 |
| 4,420,412 | A | 12/1983 | Wong | |
| 4,666,625 | A * | 5/1987 | Shaer et al. | 134/22.14 |
| 4,971,631 | A | 11/1990 | Sallee et al. | |
| 5,106,524 | A * | 4/1992 | Haskell, III | 134/22.11 |
| 5,424,000 | A * | 6/1995 | Winicov et al. | 510/100 |
| 5,759,974 | A * | 6/1998 | Menke et al. | 510/191 |
| 6,551,985 | B1 | 4/2003 | Bianchetti et al. | |
| 2002/0004471 | A1* | 1/2002 | Rader et al. | 510/191 |
| 2002/0187918 | A1* | 12/2002 | Urban | 510/505 |
| 2005/0148480 | A1* | 7/2005 | Croce | 510/201 |
| 2006/0257439 | A1* | 11/2006 | Sabnis et al. | 424/401 |

FOREIGN PATENT DOCUMENTS

| | | | |
|---|---|---|---|
| EP | 1447461 | A | 8/2004 |
| FR | 1491654 | A | 8/1967 |
| WO | 2004/072327 | A1 | 8/2004 |

OTHER PUBLICATIONS

Gorman, S. A., et al., J. Chem. Soc. Perkin Trans 2, 2000:1889-1895.
Huang X.-L., et al., Analytica Chimica Acta 2006(580):55-67.
Karpiuk, J., Phys. Chem. Chem. Phys., 2003(5):1078-1090.
Katiyar, S. S., Stabilization of malachite green in acid medium, Naturwissenschaften, 1962;49:325.
Lomonosov, S. A., et al., Intermolecular aggregation of triarylmethane dyes and its analytical important. Communication 9. Indication of pH with basic triphenylmetane dyes, Zhurnal Analiticheskoi Khimii, 1974;29 (7):1268-1270.
Belotserkovskaya, N. G., et al., The behavior of aminotriphenylcarbinols in acid media, Tr. Konf. po Probl. Primeneniya Korrelyatsion. Uravnenii v Organ, Khim., Tartusk, Gos. Univ., Tartu 1962;1:319-332.
Rumpf, P., et al., The spectra of the organic dye, malachite green, Bulletin de la Societe Chimique de France, 1995:101-103.
Skvortzov, V. N., Indicator changes of malachite green in concentrated alkali solutions, Zhumal Obhschei Khimii, 1934;4:1130-1137.
Non-Final Office Action dated Mar. 18, 2010 in co-pending U.S. Appl. No. 12/476,422.
Final Office Action dated Aug. 4, 2010 in co-pending U.S. Appl. No. 12/476,422.
Office Action dated Mar. 17, 2011 in co-pending U.S. Appl. No. 12/476,422.
Final Office Action dated Nov. 23, 2011 received in copending U.S. Appl. No. 12/476,388.
Final Office Action dated Dec. 7, 2011 received in copending U.S. Appl. No. 12/476,422.
Office Action dated Apr. 24, 2012 received in copending U.S. Appl. No. 12/476,422.

* cited by examiner

*Primary Examiner* — Ling Choi
*Assistant Examiner* — Thuy-Ai Nguyen
(74) *Attorney, Agent, or Firm* — Pepper Hamilton LLP

(57) ABSTRACT

The present invention relates to a liquid pipe unblocker comprising at least one strong acid, and a colored indicator capable of assuming different colors, depending on the acid concentration and on the polarity of the pipe unblocker solution.

10 Claims, No Drawings

PIPE UNBLOCKER WITH VISUAL TEMPERATURE AND RINSING INDICATOR

CROSS-REFERENCE TO RELATED APPLICATIONS

This application claims priority under 35 U.S.C. §119(a) to French application Ser. No. 08/53605 filed Jun. 2, 2008, which is incorporated herein by reference in its entirety.

The present invention relates to a pipe unblocker based on a strong acid comprising a visual temperature indicator, the said indicator serving also as rinsing check, i.e. as neutralisation check.

Conventional used pipe unblockers contain corrosive products which are either strong bases such as soda, or strong acids such as sulfuric acid.

Depending on the nature of the plug to be removed, the pipe unblocker will have to be more or less concentrated in order to be as efficient as possible and to use adequate amounts of strong acid or strong base.

However, presently on the market, there is no pipe unblocker, for which the concentration and therefore the temperature of a solution obtained by dilution of the unblocker in water, may be easily viewed, since there is no classical pH indicator having different changes of color in the range of pH of 0-1 which is the range of pH of interest for a cleaning and stripping application.

The inventors have thus discovered surprisingly that it was possible to obtain such an unblocker by adding to a strong acid a colored indicator capable of assuming different colors, depending on the acid concentration and on the polarity of the pipe unblocker solution. Thus, it is easy to visually check the dilution of the unblocker by means of the color of the obtained diluted solution, in particular in the range of non measurable pH of interest, i.e. in the range of pH of 0-1. This colored indicator has the additional advantage of being able to be also used as a rinsing check since any coloration disappears at a neutral pH, which indicates that the product has been properly removed, which is very important with corrosive products such as strong acids.

Such a colored indicator is different from a classical pH indicator in that the change of color is not due to the difference of color between an acid and its corresponding base and thus does not result from an acid-base equilibrium. Indeed, contrary to a classical pH indicator for which the change of color is determined by its pKa, the change of color does not arise at a predetermined pH whatever the kind of solution but depends also of the polarity of the solution.

Thus, the object of the present invention is a liquid pipe unblocker comprising:

- at least one strong acid, and
- a colored indicator capable of assuming different colors, depending on the acid concentration and on the polarity of the pipe unblocker solution, the changes of color being observed in the range of pH 0-1.

The polarity of the pipe unblocker solution will depend on the nature of the acid and also on the polarity of optional additives added into the solution. According to the polarity of the solution, the colors obtained with a given colored indicator may be different or the changes in these colors may take place at different acid concentrations.

Advantageously, the colored indicator is capable of assuming at least two, and preferably at least three different colors, in addition to the fact that it is colorless at pH above 7, and preferably above 5.

By "strong acid", is meant in the sense of the present invention, an acid which is totally dissociated in water. Strong acids are also characterized by the fact that the pKa in water is less than 0.

In particular, the strong acid(s) will comprise mineral acid(s) such as hydrochloric acid, sulfuric acid, phosphoric anhydride or a mixture thereof. Preferably this is sulfuric acid.

The acid will be used in a concentrated way in the present invention, which induces a strongly exothermic reaction when it is diluted in water. In particular, the pipe unblocker will comprise at least 80%, preferably at least 90%, and still preferably at least 95% by weight of strong acid, based on the total weight of the pipe unblocker.

The strong acid used may in particular be used as a concentrated aqueous solution. Thus, the pipe unblocker may further comprise a solvent and preferably will comprise water.

The colored indicator used in the present invention will be in the form of a carbocation in solution in the pipe unblocker (acid solution), and preferably in the form of a carbocation of the following formula (I):

(I)

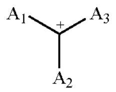

wherein $A_1$, $A_2$ and $A_3$ represent independently of each other, an aryl group, preferably phenyl, optionally substituted with one or more groups selected from a $(C_1\text{-}C_6)$ alkyl group, $-OR^1$, $-NR^2R^3$, $-SR^4$, $-CO_2H$ and $-SO_3H$, with:

- $R^1$ and $R^4$ representing independently of each other, a hydrogen atom, a $(C_1\text{-}C_6)$alkyl group, an aryl or aryl-$(C_1\text{-}C_6)$alkyl group, the aryl rings being optionally substituted with one or more groups selected from $-OH$, $(C_1\text{-}C_6)$alkoxy, $(C_1\text{-}C_6)$thioalkoxy, $(C_1\text{-}C_6)$alkyl, $-NR^5R^6$, $-CO_2H$ or $-SO_3H$, advantageously selected from $-CO_2H$ or $-SO_3H$, and preferably $-SO_3H$,
- $R^2$ and $R^3$ representing independently of each other, a hydrogen atom, a $(C_1\text{-}C_6)$alkyl group, an aryl or aryl-$(C_1\text{-}C_6)$alkyl group, the aryl rings being optionally substituted with one or more groups selected from $-OH$, $(C_1\text{-}C_6)$alkoxy, $(C_1\text{-}C_6)$thioalkoxy, $(C_1\text{-}C_6)$alkyl, $-NR^5R^6$, $-CO_2H$ or $-SO_3H$, advantageously selected from $-CO_2H$ or $-SO_3H$, and preferably $-SO_3H$, or
- $R^2$ and $R^3$ forming together a $(C_4\text{-}C_7)$alkylene chain, and
- $R^5$ and $R^6$ representing independently of each other, a hydrogen atom or a $(C_1\text{-}C_6)$alkyl group, or
- $R^5$ and $R^6$ forming together a $(C_4\text{-}C_7)$alkylene chain.

One skilled in the art will understand that the mesomeric forms of the carbocation (I) are also the object of the present invention since the carbocation (I) may be found in solution under several mesomeric forms by delocalization of the positive charge, notably of the aryl rings.

Besides, it seems that such a colored indicator in the form of a carbocation can change of color, in function of the pH and of the polarity of the solution, by delocalization of the charge, according to the speed at which the electrons move in the molecule. In these conditions, by changing of strong acid and especially by changing the polarity of the solution of the pipe unblocker, notably by using a surfactant, it is possible to obtain the changes of color in a desired range of pH, and thus in a desired concentration, which results in a desired temperature of the solution after dilution, according to the use of the final pipe unblocker.

Moreover, it is to be noted that such a carbocation can react with an hydroxyl ion to form the following tertiary alcohol of the following formula (II):

(II)

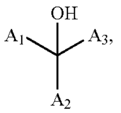

with $A_1$, $A_2$ and $A_3$ as defined above, such an alcohol being colorless. This particularity allows to use the colored indicator of the invention as a rinsing check since this reaction with the hydroxyl ion generally occurs around pH=5 in a solution of strong acid. But it is possible to modify the pH at which such a reaction occurs, notably by modifying the polarity of the solution, in order to observe a disappearance of the color notably at a pH comprised between 4 and 7, a pH between 5 and 7 being preferred.

By "alkyl", is meant in the sense of the present invention a linear or branched saturated, hydrocarbon chain.

By "($C_1$-$C_6$)alkyl", is meant in the sense of the present invention an alkyl group as defined above and including 1 to 6 carbon atoms. Advantageously, this is a methyl, ethyl, n-propyl, isopropyl, n-butyl, isobutyl, tert-butyl, pentyl or further hexyl. Preferably it is a methyl.

By "($C_1$-$C_6$)alkoxy", is meant, in the sense of the present invention, a group —OR wherein R represents a ($C_1$-$C_6$)alkyl as defined above. As an example, this may be a methoxy, ethoxy, isopropoxy, propoxy or even a tert-butoxy.

By "($C_1$-$C_6$)thioalkoxy", is meant, in the sense of the present invention, a group —SR' wherein R' represents a ($C_1$-$C_6$)alkyl as defined above. As an example, this may be a thiomethoxy, a thioethoxy, a thioisopropoxy, a thiopropoxy or even a thio-tert-butoxy.

By "($C_4$-$C_7$)alkylene" is meant, in the sense of the present invention, a $-(CH_2)_n-$ chain where n represents an integer comprised between 4 and 7, advantageously 4, 5 or 6, and preferably 4 or 5.

By "aryl", is meant in the sense of the present invention, an aromatic group, preferably including 5 to 10 carbon atoms and comprising one or more fused rings, such as for example a phenyl or naphthyl group. Advantageously, this is a phenyl.

By "aryl-($C_1$-$C_6$)alkyl", is meant in the sense of the present invention, an aryl group, as defined above bound to the molecule via a ($C_1$-$C_6$)alkyl group, as defined above. Advantageously this is a benzyl.

Advantageously, $A_1$, $A_2$ and $A_3$ represent independently of each other, a phenyl group, optionally substituted with one or several groups selected from a ($C_1$-$C_6$)alkyl group, $-OR^1$, $-NR^2R^3$, $-SR^4$, $-CO_2H$, and $-SO_3H$, $R^1$, $R^2$, $R^3$ and $R^4$ being as defined above.

Advantageously, the groups substituting the aryl or phenyl group of the radicals $A_1$, $A_2$ and $A_3$, if any, are located in the para position.

Advantageously, at least one, preferably at least two of the radicals $A_1$, $A_2$ and $A_3$ represent(s) an aryl group, preferably a phenyl, substituted with a $-NR^2R^3$ group, with $R^2$ and $R^3$ such as defined above, preferably in the para position.

Still advantageously, $A_1$, $A_2$ and $A_3$ represent independently of each other, an aryl group, preferably phenyl, optionally substituted with one or more $-NR^2R^3$ or $-SO_3H$ groups, with $R^2$ and $R^3$ as defined above, and advantageously in the para position.

Advantageously, the colored indicator will form one of the following carbocations in an acid solution:

(1)

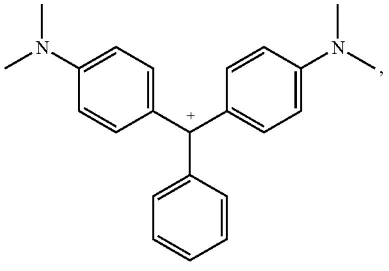

(2)

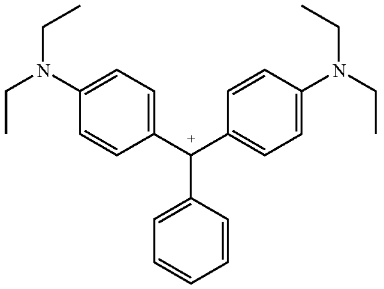

or (3)

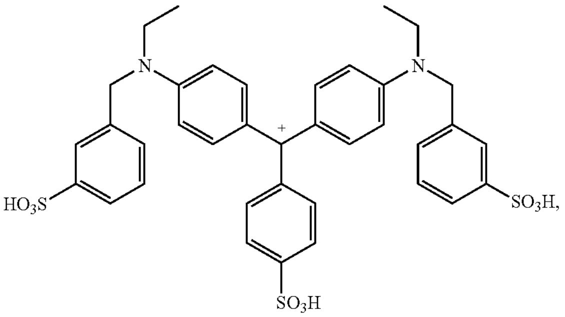

and preferably will form the carbocation (1).

These carbocations are obtained by addition in the pipe unblocker, of one of the following colored indicators: malachite green for (1), brilliant green for (2) or light green SF yellowish for (3), compounds which respectively fit the following formulae:

(1a)

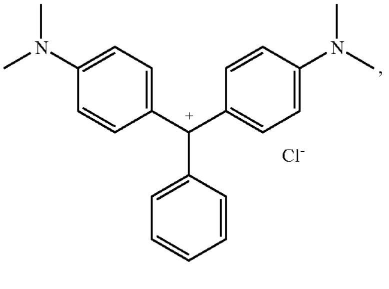

-continued (2a)

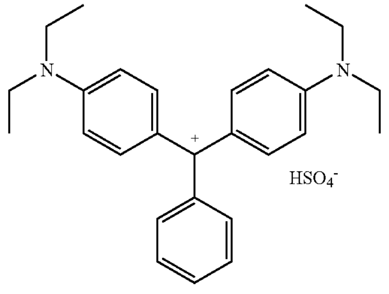

and (3a)

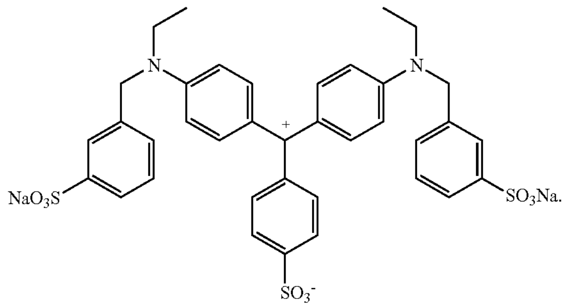

In a particular embodiment, the pipe unblocker will comprise from 0.005 to 0.5%, preferably from 0.001 to 0.02%, and advantageously about 0.01%, by weight of colored indicator, based on the total weight of the pipe unblocker.

Advantageously, a surfactant may be added to the pipe unblocker, preferably a surfactant of the anionic type.

Indeed, the inventors have noticed surprisingly that by adding a surfactant the obtained colors may be intensified, a larger palette of colors may be obtained and color transitions may be changed (notably, the changes of color arise in a more narrow range of pH). This thus provides the possibility of adjusting the acid concentration at which the color changes will take place. Without however having the intention of being limited by such an interpretation, the inventors assume that by adding such a surfactant, this changes the polarity of the acid solution, thereby allowing modification of the changes in color. Moreover, it seems that the addition of such a surfactant allows to limit the reaction of the carbocation with an hydroxyl ion to give the alcohol of formula (II) and thus to stabilize the carbocation. This could explain notably the obtaining of more intense colors.

Advantageously, the surfactant will be a salt of a ($C_1$-$C_{20}$) alkyl-aryl-sulfonic acid, a salt of an aryl-sulfonic acid, a salt of an ($C_2$-$C_{20}$)alkenyl-sulfonic acid, or a mixture thereof.

Advantageously, this will be a salt of a ($C_1$-$C_{20}$)alkyl-aryl-sulfonic acid, a salt of a ($C_2$-$C_{20}$)alkenyl-sulfonic acid, or a mixture thereof.

Still advantageously, this will be a salt of a ($C_1$-$C_{20}$)alkyl-aryl-sulfonic acid.

By "($C_1$-$C_{20}$)alkyl", is meant in the sense of the present invention, an alkyl group as defined above including 1 to 20 carbon atoms. Preferably, this will be a linear chain, advantageously including 12 carbon atoms (dodecyl group).

By "($C_2$-$C_{20}$)alkenyl", is meant in the sense of the present invention, a linear or branched hydrocarbon chain including at least one double bond and including 2 to 20 carbon atoms. Advantageously, the alkenyl will include a single double bond, preferably in the alpha position relatively to the sulfonic acid function. Still more advantageously, the alkenyl will include 12 to 14 carbon atoms.

By "salt", is meant in the sense of the present invention, a salt formed with the sulfonic acid function of the surfactant, i.e. a salt formed by replacing the acid proton of the sulfonic acid function by a metal ion, for example an alkaline metal ion ($Na^+$, $K^+$ or $Li^+$ for example), a earth alkaline metal ion (like $Ca^{2+}$ or $Mg^{2+}$) or an aluminium ion or by coordination of the sulfonic acid function with an organic or inorganic base. This salt may therefore be obtained by adding an organic or inorganic base to the sulfonic acid derivative. As an inorganic base, mention may be made of aluminium hydroxide, calcium hydroxide, potassium hydroxide, sodium carbonate and sodium hydroxide. As an organic base, mention may be made of amines such as diethanolamine, ethanolamine, N-methylglucamine, triethanolamine, tromethamine, triethylamine, isopropylamine, ammonia or the like.

In particular, the proton of the sulfonic acid function will be replaced with an alkaline metal ion, in particular with $Na^+$, or will be coordinated to ammonia, in order to form an ammonium, to a monoalkylamine, to a dialkylamine, or to a trialkylamine. Advantageously, the proton will be replaced with an alkaline ion such as $Na^+$ or will be coordinated to ammonia or to a monoalkylamine, and preferably to a monoalkylamine.

By "monoalkylamine", is meant in the sense of the present invention, a primary amine of formula R—$NH_2$, wherein R represents a ($C_1$-$C_6$)alkyl chain as defined above. Preferably, this will be isopropylamine.

By "dialkylamine", is meant in the sense of the present invention, a secondary amine of formula RR'NH, wherein R and R' represent independently of each other a ($C_1$-$C_6$)alkyl chain as defined above.

By "trialkylamine", is meant in the sense of the present invention, a tertiary amine of formula RR'R"N, wherein R, R' and R" represent independently of each other a ($C_1$-$C_6$)alkyl chain as defined above. Advantageously, this will be triethylamine.

Advantageously, the surfactant will be the isopropylamine salt of dodecylbenzene-sulfonic acid (marketed under the name of Caflon® MIS by Univar) or a sodium alpha-($C_{12}$-$C_{14}$)alkenyl-sulfonate or a mixture thereof, such as a mixture of sodium alpha-alkenyl-sulfonates including 14 to 16 carbon atoms (marketed under the name of Ifrapon® AOS 38P by Ifrachimie). Preferably, this will be the isopropylamine salt of dodecylbenzene-sulfonic acid.

Advantageously, the pipe unblocker will comprise up to about 5%, preferably 0.05-2% by weight of surfactant, based on the total weight of the pipe unblocker.

In a particular embodiment, the pipe unblocker comprises:

- 99.89% by weight, based on the total weight of the unblocker, of 96% sulfuric acid,
- 0.01% by weight of malachite green, based on the total weight of the unblocker, and
- 0.10% by weight of the isopropylamine salt of dodecylbenzene-sulfonic acid, based on the total weight of the unblocker.

By "96% sulfuric acid", is meant in the sense of the present invention, an aqueous solution of sulfuric acid comprising 96% by weight of sulfuric acid, based on the total weight of the solution, the remainder being water.

The present invention also relates to the use of a pipe unblocker as defined above, involving the dilution of said pipe unblocker in water until the characteristic color is obtained corresponding to the desired strong acid concentration leading to the adapted temperature for removing the blockage in the pipe.

In particular, the temperature will be adapted to the nature of the blockage and/or of the pipe.

Such an unblocker may be notably used for removing inert inorganic deposits which block a pipe. Such deposits may be fat residues, hair, paper, calcareous substances, fabrics or even cigarette butts.

The unblocker may thus be used in pipes of installations for domestic use, such as showers, sinks, washbasins, bidets, urinals, or even toilets. The pipes may in particular be in lead or in PVC. In the case of PVC, it is preferable not to exceed a temperature of 60° C. so as not to deform the pipe and notably the siphon. It will therefore be of particular interest to have a temperature indicator in the unblocker in order to avoid this problem.

The present invention will be better understood with the help of examples which follow which are only used for illustrating the invention and not for limiting the scope thereof.

EXAMPLE 1

A solution was prepared by mixing in 33% hydrochloric acid or in 96% sulfuric acid, fluorescein of the following formula:

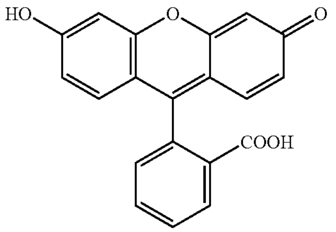

However, in this case, the acid solution assumes a yellow coloration and does not change color according to the acid concentration in the range of pH of 0-1.

Fluorescein therefore cannot be used as a colored indicator within the scope of the present invention.

EXAMPLE 2

A solution was prepared by mixing, in 33% hydrochloric acid or 96% sulfuric acid, helianthin of the following formula:

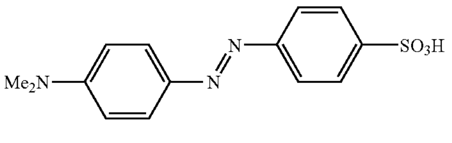

However, in this case, the acid solution assumes a red coloration and does not change color according to the acid concentration in the range of pH of 0-1.

Helianthin therefore cannot be used as a colored indicator within the scope of the present invention.

EXAMPLE 3

A solution was prepared by mixing, in 33% hydrochloric acid or in 96% sulfuric acid, bromothymol blue (BBT) of the following formula:

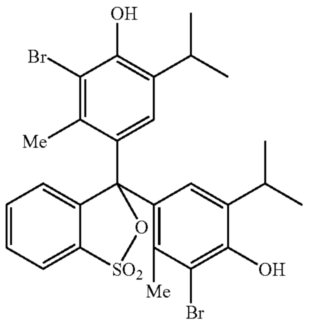

However, in this case, the strong acid solution remains colorless and does not change color according to the acid concentration in the range of pH of 0-1.

Bromothymol blue (BBT) therefore cannot be used as a colored indicator within the scope of the present invention.

EXAMPLE 4

A solution was prepared by mixing, in 33% hydrochloric acid or in 96% sulfuric acid, brilliant green.

In this case, the following colors are observed from the less concentrated to the most concentrated solution:

in the case of sulfuric acid:

orange-yellow-colorless, in the case of hydrochloric acid:

orange-yellow-blue-colorless.

When a surfactant is added (Caflon® MIS or Ifrapon® AOS 38P), the following colors are observed:

in the case of sulfuric acid:

orange-yellow-green-colorless, in the case of hydrochloric acid:

orange-yellow-green-blue-colorless.

All the changes of color are observed at a pH<1, except for the disappearance of the color.

EXAMPLE 5

A solution was prepared by mixing, in 33% hydrochloric acid or in 96% sulfuric acid, light green SF yellowish.

In this case, the following colors are observed from the less concentrated to the most concentrated solution:

in the case of sulfuric acid:

orange-yellow-colorless, in the case of hydrochloric acid:

orange-yellow-blue-colorless.

When a surfactant is added (Caflon® MIS or Ifrapon® AOS 38P), the following colors are observed:

in the case of sulfuric acid:

orange-yellow-green-colorless, in the case of hydrochloric acid orange-yellow-green-blue-colorless.

All the changes of color are observed at a pH<1, except for the disappearance of the color.

EXAMPLE 6

A solution was prepared by mixing in 33% hydrochloric acid or in 96% sulfuric acid, malachite green.

In this case, we observe the following colors from the less concentrated to the most concentrated solution, these colors being a little brighter than in both previous cases (Examples 4 and 5):

in the case of sulfuric acid:
orange-yellow-colorless,
in the case of hydrochloric acid:
orange-yellow-blue-colorless.

When a surfactant is added (Caflon® MIS or Ifrapon® AOS 38P), the following colors are observed:
in the case of sulfuric acid:
orange-yellow-green-colorless,
in the case of hydrochloric acid
orange-yellow-green-blue-colorless.

All the changes of color are observed at a pH<1, except for the disappearance of the color.

It should be noted that depending on the nature and/or the concentration of the surfactant used, the color changes will not occur at the same acid concentrations.

The formulator will accordingly adapt the formulation depending on its particular destination.

EXAMPLE 7

A pipe unblocker according to the present invention was prepared by adding malachite green and isopropylamine salt of dodecylbenzene-sulfonic acid (marketed as Caflon® MIS by Univar or Nansa® YS94 by Huntsman) to a concentrated aqueous solution of sulfuric acid in the following proportions:

| Compounds | Amounts |
|---|---|
| 96% sulfuric acid | 999 kg |
| Isopropylamine salt of dodecylbenzene-sulfonic acid | 1 kg |
| Malachite green | 0.1 kg |

When this pipe unblocker, which is found in a very concentrated form, is diluted in water, it may assume the following colors:

- green, which corresponds to a temperature of the solution comprised between 40 and 60° C. just after dilution, which is adapted for preventive treatment of not very blocked pipes,
- yellow, which corresponds to a temperature of a solution comprised between 60 and 80° C. just after dilution, which is adapted for treatment of highly blocked pipes with a low flow, and
- orange, which corresponds to a temperature of the solution above 80° C. just after dilution, which is adapted for a treatment of blocked pipes, notably by a fat plug, with no flow.

All the changes of color are observed at a pH<1. Moreover, when the pH is above 5, the coloration totally disappears, whereby it is possible to have a good indication of rinsing.

The invention claimed is:

1. A liquid pipe unblocker solution comprising:
one or more strong acids,
a colored indicator chosen from malachite green, brilliant green, and light green SF yellowish, wherein the colored indicator is capable of assuming at least three colors in the range of pH of 0-1, and wherein the colored indicator is colorless for pH above 7 and wherein the colored indicator is from 0.001 to 0.02% by weight based on the total weight of the pipe unblocker solution; and
a surfactant selected from a salt of a ($C_1$-$C_{20}$) alkyl-aryl-sulfonic acid, a salt of an aryl-sulfonic acid, a salt of an ($C_2$-$C_{20}$) alkenyl-sulfonic acid or a mixture thereof, wherein the surfactant is up to about 5% by weight based on the total weight of the pipe unblocker solution.

2. The pipe unblocker solution according to claim 1, wherein the strong acid(s) is(are) selected from hydrochloric acid, sulfuric acid, and phosphoric acid or a mixture thereof.

3. The pipe unblocker solution according to claim 1, wherein it comprises at least 80% by weight of strong acid, based on the total weight of the pipe unblocker solution.

4. The pipe unblocker solution according to claim 1, wherein the colored indicator is in the form of a carbocation in solution in the pipe unblocker solution.

5. The pipe unblocker solution according to claim 1, wherein it comprises:
99.89% by weight, based on the total weight of the pipe unblocker solution, of 96% sulfuric acid,
0.01% by weight of malachite green, based on the total weight of the pipe unblocker solution, and
0.10% by weight of the isopropylamine salt of dodecylbenzene sulfonic acid, based on the total weight of the pipe unblocker solution.

6. A method of unblocking a pipe comprising diluting the pipe unblocker solution according to claim 1 in water until the characteristic color is obtained corresponding to the desired strong acid concentration leading to the temperature adapted for removing the blockage in the pipe.

7. The method according to claim 6, wherein the temperature is adapted to the nature of the blockage and/or of the pipe.

8. The pipe unblocker solution according to claim 1, wherein the colored indicator is malachite green.

9. The pipe unblocker solution according to claim 1, wherein the surfactant is the isopropylamine salt of dodecylbenzene-sulfonic acid.

10. The pipe unblocker solution according to claim 1, wherein it comprises from 0.05 to 0.2% by weight of surfactant based on the total weight of the pipe unblocker solution.

* * * * *